UNITED STATES PATENT OFFICE.

EDMUND BOUŠEK, OF WIENER-NEUSTADT, AUSTRIA-HUNGARY, EXECUTOR OF CHRISTIAN ESSER, DECEASED, ASSIGNOR TO PILGRIM PAPER COMPANY, OF NEW YORK, N. Y., A CORPORATION OF MAINE.

PAPER AND PAPER-BOARD.

No. 844,657.      Specification of Letters Patent.      Patented Feb. 19, 1907.

Application filed December 20, 1905. Serial No. 292,661.

*To all whom it may concern:*

Be it known that CHRISTIAN ESSER, deceased, in his lifetime a resident of Wiener-Neustadt, Austria, and a subject of the Emperor of Austria, previous to his death had invented certain new and useful Improvements in Paper or Board, of which I, EDMUND BOUŠEK, a resident of Wiener Neustadt, Austria, and a subject of the Emperor of Austria, as executor of the last will and testament of the said CHRISTIAN ESSER, present the following full, clear, and exact description.

The invention relates to certain new and useful improvements in paper and paperboard, and has for its object the utilization of peat as a base or stock.

Numerous attempts have been made to employ this material in the manufacture of paper and paper-board; but they have been more or less unsuccessful for various reasons, although its cheapness and wide distribution in nature render it a very desirable material if a suitable product can be made therefrom at a moderate expense.

As is well known, peat consists of partially decomposed or decayed vegetable growths or plants—such as mosses, ferns, grasses, and the like—the more common plants found in peat being spaghnum, a common species of moss, and eriophorum, a perennial rush-like plant. Peat is seldom homogeneous, however, and a very common variety is eriophoro-spaghnum, a mixture of the two above-mentioned, in which will also be found partially-decomposed grasses, twigs, timber, and other vegetable growths. The structure of peat also varies considerably according to its age. In the old peat found at the bottom of the bog not only the softer vegetable matter, but the fibers of the plants as well, are often totally destroyed, and this peat is unsuitable for the purpose. The more recent peat is, however, valuable according to the strength and texture of its fibers, and in the invention it was preferred to use recent eriophoro-spaghnum, as this produces a most satisfactory product.

In order to thoroughly understand the present invention it is necessary to consider briefly the formation of peat and its constitution as found in its natural state.

As the mosses, ferns, and other plants die down and are superseded by later growths the bog or swamp in which they have been growing submerges them and serves as a blanket or preventative of too rapid decomposition. This is not completely accomplished, however, for the oxygen in the water gradually unites with the dead growth, and decomposition or oxidation of the mass is gradually brought about, the softer vegetable matters being attacked first and the cellulose or fibrous portion last. It should be understood that all plant life comprises a skeleton or framework of cellulose having a fibrous character and a web or softer portion of other vegetable matter, which latter surrounds the cellulose or in which the cellulose is embedded. The decomposition or partial decomposition which takes place in the submerged mass attacks the softer vegetable matter first, and it is reduced to a gluey sticky gelatinous condition, while still surrounding the cellulose and enveloping it unless removed by some external action. Should this decomposition continue for an indefinite period, as has been the case with what we have previously described as old peat, the cellulose will also be attacked and in some cases be completely reduced; but this occurs only after long periods, as the cellulose is much harder and successfully resists the decomposing action long after the soft vegetable matter has been completely transformed and reduced.

His improved board is one which contains not only all of the cellulose found in the peat, both the coarse and fine fibers, but contains a large amount of this softer vegetable gelatinous matter above mentioned, and in the finished product the coarser fibers give strength and body to the board, and the finer ones serve to felt and assist in binding the same together, while comparatively large quantities of the soft gelatinous matter are present, adhering to and enveloping or surrounding all of the fibers and binding them firmly together.

In preparing the improved board it is necessary that great care be taken through all the steps of the process to preserve and retain the gelatinous matter of the peat, which is more or less soluble in water and easily lost and a method which has been found satisfactory is as follows:

He takes peat as it is brought from the bog in its naturally wet, soggy, and spongy condition and treats it mechanically by stamping, crushing, rubbing, or other means, so that the cellulose fibers, or rather the bundles of fibers, as the individual fibers are found in bundles or clusters in the natural condition, are completely reduced and the various fibers separated from each other, this operation being preferably performed upon the turf without floating it in water or without subjecting it to any action which would remove the gelatinous matter normally in the peat. By this operation the individual fibers are separated, and the new faces exposed by the disintegration of the bundles are all smeared and coated with the gelatinous matter, which is forced into the pores of the fibers, and thus forms a covering or envelop for each one. The gelatinous matter adheres very strongly to the fibers thus reduced, as their surfaces are very irregular and contain recesses, crevices, projections, &c., to which the said matter readily adheres, and the sticky nature of the coating causes the fibers, no matter how minute, to adhere together and to be readily retained. The half-stuff thus obtained is then diluted with sufficient water (preferably cold water, so as not to dissolve or remove any more of the vegetable matter than can be helped) to float it and is then ready for use. The peat pulp thus produced may then be pumped directly to the stuff-chest or machine-chest of the machine and run into board without further treatment, although it may be desirable to mix it with a percentage of sulfid or other stock which has been previously reduced to a pulp, the exact amount of this foreign stuff varying according to the condition, quality, and strength of the peat fibers and the requirements of the finished product.

When the peat-stock is used in connection with other stock, the stuff should be thoroughly intermixed, and for this purpose it is desirable that the foreign stock be reduced to a pulp, and, together with the peat-stock, it may be placed in a beating-engine, which is then set in operation, although it is desirable that care should be taken that the beating-roll is not lowered sufficiently to injuriously affect the coated peat fibers.

It frequently occurs that the peat will contain a considerable portion of cellulose equivalent to sulfid or other like stock, and if this be reduced to a pulp it will be found sufficient to give the desired strength to the finished product without the addition of extraneous or foreign fiber.

The board of the invention, as will thus be seen, is one which contains substantially all of the valuable ingredients to be found in the natural peat, including both the long and short fibers—that is, substantially all of the cellulose, and in addition the natural gelatinous or sticky vegetable matter, which is extremely valuable in preventing the loss of minute fibers and which forms an admirable binder or cementing medium for the entire mass. When produced by the process above described, the gelatinous matter will be found firmly adhering to all of the fibers and filling the recesses and irregularities in the surfaces thereof, thereby effecting the retention and presence in the finished product of a maximum quantity thereof.

In this specification I have referred to and described the product obtained as a paperboard, and this is one of the most important forms in which the invention may be put to use; but it is obvious that other equally valuable products may be produced, such as molded products of a very wide variety, and in forming the same it is only necessary that the material be compressed into molds of the proper character instead of running the stuff into board, as above described, and I therefore wish it to be understood that his invention is equally applicable to this latter character of product.

The board above described will be found to possess the desirable qualities of strength and durability, and in addition thereto it is moth and vermin proof, damp repellent even if unsized, and it is also a non-conductor of electricity and an excellent insulating material.

By the expression "peat fibers in substantially their natural condition" in the claim is meant peat fibers which have not been chemically treated in such manner as to split them or to dissolve out the gelatinous matter naturally adherent thereto.

Having thus described the invention, what is claimed, and desired to be secured by Letters Patent, is—

As an article of manufacture, paper board or the like containing, in its finished condition, long and short peat fibers in substantially their natural condition, bound together by the gelatinous matter normally contained in the peat, substantially as described.

In testimony whereof I have hereunto set my hand in the presence of two subscribing witnesses.

EDMUND BOUSEK,
*Executor of the estate of Christian Esser, deceased.*

Witnesses:
 ALVESTO S. HOGUE,
 D. LUDWIG BLINK.